(No Model.)

M. MANN.
DEVICE FOR CONNECTING HAY RAKES AND LOADERS WITH WAGONS.

No. 520,532. Patented May 29, 1894.

Witnesses:
R. H. Orwig
C. F. Wilcox

Inventor:
Marcellus Mann
By Thomas G. Orwig
and J. Ralph Orwig, Attys.

THE NATIONAL LITHOGRAPHING COMPANY,
WASHINGTON, D. C.

UNITED STATES PATENT OFFICE.

MARCELLUS MANN, OF CLEARFIELD, IOWA.

DEVICE FOR CONNECTING HAY RAKES AND LOADERS WITH WAGONS.

SPECIFICATION forming part of Letters Patent No. 520,532, dated May 29, 1894.

Application filed January 8, 1894. Serial No. 496,210. (No model.)

*To all whom it may concern:*

Be it known that I, MARCELLUS MANN, a citizen of the United States of America, residing at Clearfield, in the county of Taylor and State of Iowa, have invented a new and useful Device for Coupling Hay Rakes and Loaders to Wagons, of which the following is a specification.

The object of my invention is to provide means whereby a hay rake or analogous device may be coupled or uncoupled to a wagon by a person upon the wagon to facilitate operations in a hay field and to obviate the dangers incident to the operator getting beneath a wagon each time the same is attached to or disengaged from a wagon.

With this object in view my invention consists in the construction, arrangement and combination with a wagon and hay rake of a coupling device as hereinafter set forth, pointed out in my claims and illustrated in the accompanying drawings, in which—

Figure 1:
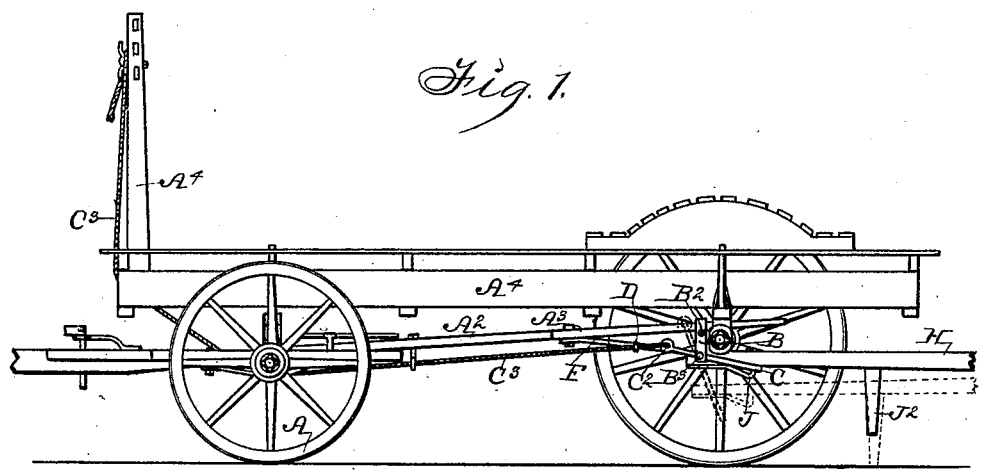
Figure 2:
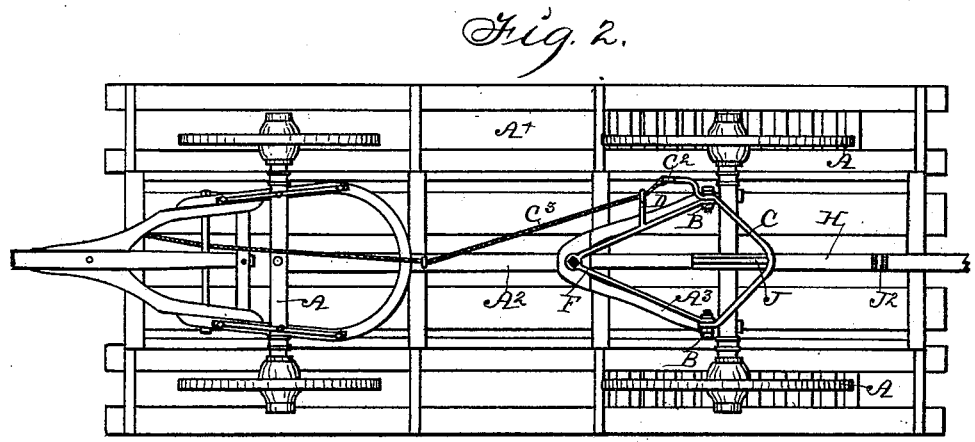
Figure 3:
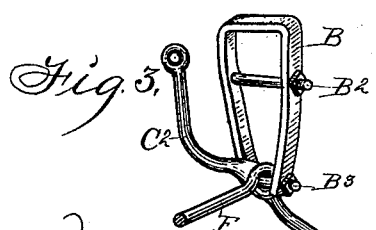

Figure 1 is a side elevation of a wagon with the wheels removed from one side and my invention applied thereto and the tongue of a hay rake in engagement with the coupling device and also shown by dotted lines disengaged therefrom. Fig. 2 is a bottom view of a wagon and the tongue of a hay rake connected therewith by means of my coupling device and Fig. 3 is a perspective view of one of the devices for securing the coupling mechanism to the hounds of the wagon.

Referring to the accompanying drawings the reference letters A are used to designate the wagon trucks, $A^2$ the reach, $A^3$ the rear hounds and $A^4$ the hay rack.

B, B designate hangers formed of metal and adapted to encircle the hounds of a wagon and be adjustably and detachably connected therewith by means of the bolts $B^2$ and having in their lower ends the bolts $B^3$ for purposes hereinafter explained.

C designates a bar bowed downwardly in its central portion and having eyes formed in its ends to admit the bolts $B^3$ one end of said bar, $C^2$, is extended upwardly beyond the bolt and is also provided with an eye to which a rope $C^3$ may be attached to operate the said bar. This rope is extended forward through an eye D secured to a suitable part of the wagon frame in proximity to the part $C^2$, and is also extended through suitable supports to the forward top portion of the hay rack where it is secured to a support $D^2$ so that it may at all times be within convenient reach of the driver.

F designate braces fixed to the reach $A^3$ and extended backwardly and connected with the bolts $B^2$ to strengthen the said hangers.

H designates the tongue of a hay rake or analogous machine having formed on, or fixed to, its under forward end a device adapted to be engaged by the said bar C when in an elevated position. In the present instance a hook J is secured thereto and projects rearwardly therefrom. An upright $J^2$ projects from the under side of said tongue and is of such a length as to support the tongue at such an elevation that its forward end will pass between the bar C and the rear axle.

In practical operation the hay rake is placed in position in the field and the wagon provided with the coupling device is backed in such a manner as to admit the tongue of the hay rake between the bar C and the rear axle. The rope $C^3$ is then pulled and said bar elevated as required to engage the hook in said tongue and elevate it sufficiently to draw the upright $J^2$ out of engagement with the ground surface. When the rope is secured the hay rake will be securely attached to the wagon, when it is desirable to disconnect the hay rake the rope is paid out and the bar C by force of gravity drops downwardly the upright on the tongue of the hay rake engages the ground surface and elevates the hook at its end above the bar C to uncouple.

Having thus described my invention, what I claim as new therein, and desire to secure by Letters Patent of the United States therefor, is—

1. A device for coupling hay rakes and the like to wagons, comprising a bar pivoted beneath a wagon and bowed downwardly at its central portion, a rope connected therewith and extended upwardly to the top of the wagon, by which said bar may be operated, a hay rake tongue having means for supporting it in an approximately horizontal position and a hook on its forward end adapted to be engaged by said bar, and when the bar is elevated support the tongue for the purposes stated.

2. A device for coupling hay rakes and the like to wagons, comprising a bar pivoted beneath the wagon and bowed downwardly at its central portion, a rope connected therewith to operate the bar, a hay rake tongue having an upright secured thereto for the purposes stated, and a hook formed on or fixed to its forward end, for the purposes stated.

3. A device for coupling hay rakes and the like to wagons, comprising suitable hangers adapted to be detachably secured to the hounds of a wagon, a bar pivotally mounted in said hanger bowed downwardly at its central portion and having one of its ends projecting upwardly, braces to secure said hanger in place, a rope fastened to said end portion, a hay rake tongue and support projecting downwardly therefrom, and a hook formed at its forward end, all arranged and combined substantially in the manner set forth, for the purposes stated.

MARCELLUS MANN.

Witnesses:
J. F. LOVITT,
T. C. HOPPERLY.